United States Patent [19]

Kock

[11] Patent Number: 5,749,267

[45] Date of Patent: May 12, 1998

[54] DEVICE TO REDUCE VENTILATION LOSS OF A HIGH-SPEED GEAR MECHANISM

[75] Inventor: Bernhard Kock, Duisburg, Germany

[73] Assignee: Mannesmann Aktiengesellschaft, Düsseldorf, Germany

[21] Appl. No.: 670,902

[22] Filed: Jun. 26, 1996

[30] Foreign Application Priority Data

Jun. 29, 1995 [DE] Germany ............... 195 25 102.4

[51] Int. Cl.$^6$ ............................................. F16H 57/04
[52] U.S. Cl. ........................ 74/467; 184/6.12; 184/6.26
[58] Field of Search ................ 74/467, 468; 184/6.12, 184/6.26

[56] References Cited

U.S. PATENT DOCUMENTS

| | | | |
|---|---|---|---|
| 1,220,810 | 3/1917 | Alquist | 184/6.12 |
| 1,912,422 | 6/1933 | Andersson | 184/6.12 X |
| 3,006,439 | 10/1961 | Molinaro | 184/6.12 |
| 3,827,311 | 8/1974 | Pere | 184/6.12 X |
| 4,745,816 | 5/1988 | Horiuchi et al. | 184/6.12 X |
| 5,085,100 | 2/1992 | Duello | 74/606 R |

OTHER PUBLICATIONS

Article entitled "Tauchschmierung schnellaufender Achsgetriebe für Schienenfahrzzeuge" pp. 60–65 by C. Jaufmann, et al. published in Antriebstechnik 33 (1994) Nr. 9.

Primary Examiner—Allan D. Herrmann
Attorney, Agent, or Firm—Cohen, Pontani, Lieberman, Pavane

[57] ABSTRACT

A device for reducing ventilation loss of a high-speed gear mechanism with a gear housing NS intermeshing gears, which are surrounded by a casing and to which lubricant is supplied in the engagement area for the purpose of reducing friction. The gear mechanism consists, in a known manner, of a gearwheel and a pinion that intermeshes therewith. Utilizing the pressure that is automatically established in the tooth engagement and disengagement area, only the pinion is encapsulated over area of more than 180° of its peripheral distance. The end of the encapsulation in the tooth disengagement area is designed so that there is constant enlargement of the uncovered cross-sectional area between the pinion and the gearwheel. Additionally, and the encapsulation is sealed on both sides relative to the non-toothed shaft area of the pinion.

8 Claims, 3 Drawing Sheets

DEVICE TO REDUCE VENTILATION LOSS OF A HIGH-SPEED GEAR MECHANISM

BACKGROUND OF THE INVENTION

1. Field of the Invention

The invention relates to a device for reducing the ventilation loss of a high-speed gear mechanism.

2. Description of the Prior Art

The total no-load loss of a gear is made up of the bearing no-load loss, the hydraulic loss and the ventilation loss. Relative to the other losses, the ventilation loss is significant only at peripheral speeds of 50 m/sec and above (Antriebstechnik ["Drive Technology"] 33, 1994, No. 9, pp. 60–65). In order to reduce ventilation loss, it has already been suggested in U.S. Pat. No. 3,489,034 to attach a vacuum pump to the sealed air-tight gear housing for the purpose of extracting the air-lubricant mixture. This arrangement reduces the ventilation loss, decreases the noise of the intermeshing gears, and lowers the operating temperature. However, the constructive expense of the arrangement is disadvantageous, as are the costs of acquiring and operating the vacuum pump.

A conventional device is known from U.S. Pat. No. 5,085,100. This device is a high-speed gear mechanism with multiple intermeshing gears arranged in a gear housing. In order to reduce ventilation loss, all of the gears are surrounded by a casing, which has an opening to permit the unobstructed inflow and outflow of air and coolant in the engagement area. The lubricant is sprayed outside of the engagement area through an opening in the casing. The design of this opening is such that the supplied coolant can be sprayed off tangentially soon after the spray-in point. This is meant to reduce the turbulence loss of the coolant. The complete encasement of all of the gears resembles a smaller gearbox inside of the carrying gear housing. Because of the openings, the pressures prevailing inside the casing area and in the gear housing are approximately equal.

SUMMARY OF THE INVENTION

Accordingly, it is an object of the present invention to provide a device which reduces ventilation loss of a high-speed gear mechanism and avoids the drawbacks of the prior art. Pursuant to this object, and others which will become apparent hereafter, one aspect of the present invention resides in a device having means for supplying lubricant to a narrowing engagement area of a pinion and a gear wheel arranged in a high-speed gear mechanism housing. Means are further provided for encapsulating only the pinion within the gear housing over more than 180° of its perimeter so that the encapsulating means has a front end in the engagement area and a back end in a disengagement area. Means are also provided for sealing the encapsulating means on both sides relative to non-toothed shaft sections of the pinion.

In a further embodiment of the invention encapsulating means includes two housing parts connected to one another on a radial plane. Means are provided for attaching the housing parts to the gear housing.

In contrast to the known prior art, the entire gear housing is not evacuated; rather, use is made of the negative pressure established by the encapsulation of the pinion in the area of the gear teeth. Although this negative pressure does not reach the level of a vacuum attainable with a vacuum pump, it is sufficient for practical use in order to reduce ventilation loss. The prerequisite for producing the desired negative pressure is sealing the stationary encapsulation relative to the rotating pinion. To this end, the encapsulation preferably has, on both side areas, a labyrinth section, which interacts either with the non-toothed shaft section of the pinion or with a pressure collar attached thereto. The question of attaching a pressure collar is related to the design of the pinion bearing. If this bearing is designed as an axial bearing, then the pressure collar can be dispensed with.

Production of the desired negative pressure is promoted when the end of the encapsulation in the disengagement area is designed so that there is a constant enlargement of the non-covered cross-sectional area between the pinion and the gearwheel. The lubricant that is sprayed tangentially in this area acts in the manner of a water-jet pump, provided that the lubricant feed is located on the tooth engagement side. In principle, it is also possible for the lubricant feed to be located on the tooth disengagement side. However, this would detract from the attainable negative pressure.

The preferable division of the encapsulation on a radial plane has the advantage of allowing the easy subsequent installation of this encapsulation into an already existing gear.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
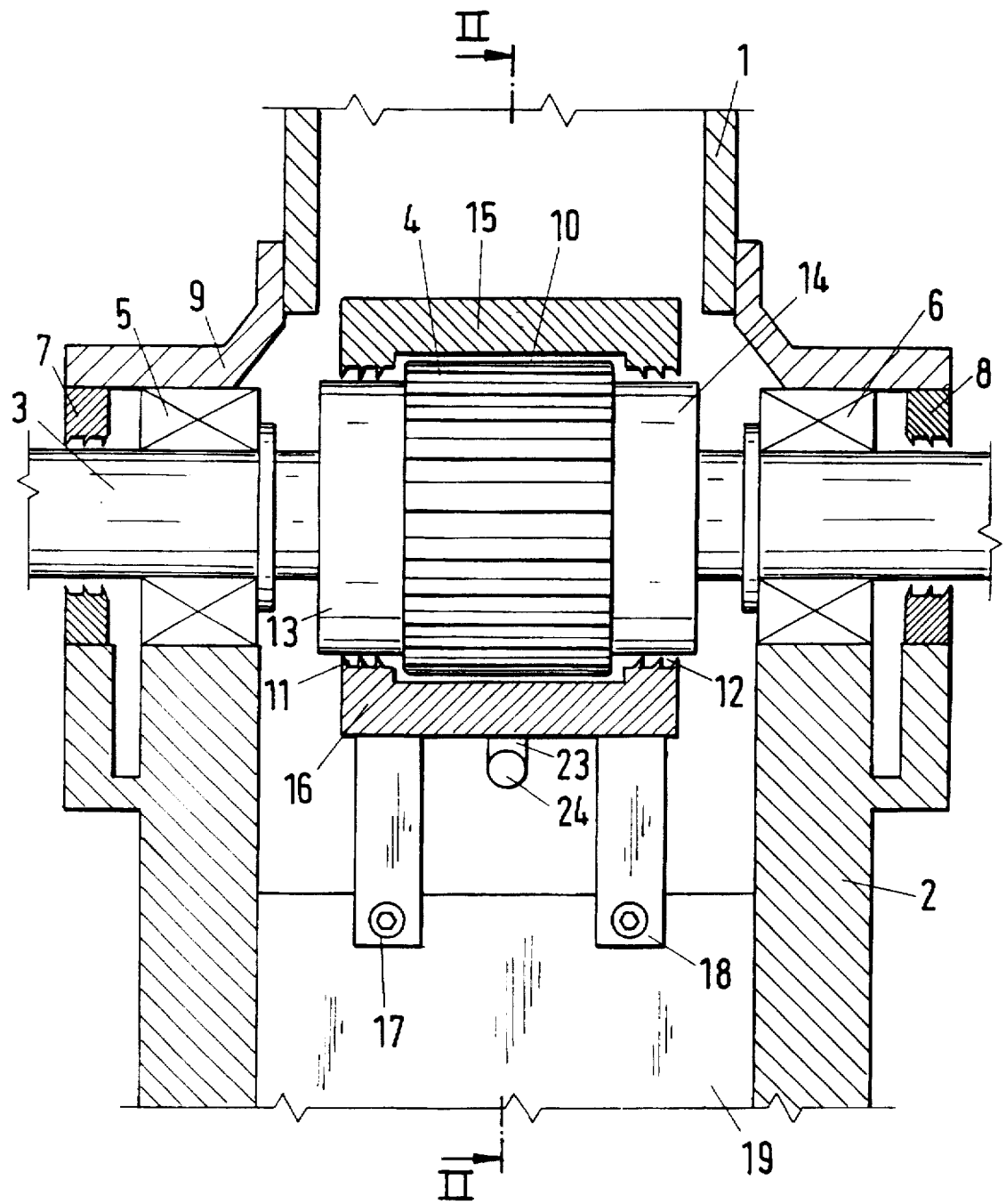
FIG. 1 is a cross-section through a partial area of a gear with an encapsulation according to the present invention.

A section of a high-speed gear mechanism with the device to reduce ventilation loss according to the invention is shown in cross-section in FIG. 1. The gear is located in a housing, which consists of a gearbox upper part 1 and a gearbox lower part 2. A pinion 4 is attached to a shaft 3 and is within the housing. Usually, the shaft 3 and the pinion 4 are produced from a single piece. The shaft 3 is mounted on two bearings 5, 6. In the illustrated embodiment, both bearings 5, 6 are axial bearings. In order to seal the shaft 3, two seals 7, 8, which are designed here, for example, as labyrinth seals are provided at points of egress of the shaft from the housing. Depending on requirements and operating conditions, other types of seals can also be used, for example, a pressure collar. The end of the bearing space consists of a bearing cover 9, which is attached to the gearbox upper part 1.

According to the invention, the pinion 4 is encapsulated. This is done so that the remaining gap 10 between the pinion 4 and the encapsulation is as small as possible. Nonetheless, the negative pressure that can be produced with this encapsulation can only be maintained if the encapsulated space is sealed off. For this purpose, in each of the two side areas of the encapsulation, there is a labyrinth section 11, 12, which interacts with a non-toothed shaft section 13, 14 of the pinion 4. For reasons of simplified assembly, the encapsulation housing is divided on a radial plane, so that it consists of an upper part 15 and a lower part 16. The lower part 16 is supported via brackets 17, 18, which are screwed to a reinforcement plate 19, which is attached to the gearbox lower part 2. In addition, the lower part 16 is also connected by means of a welded-on claw 20 to a bracket 21, which is attached to the gearbox lower part 2 by screws 30 (FIG. 2).

Figure 2:
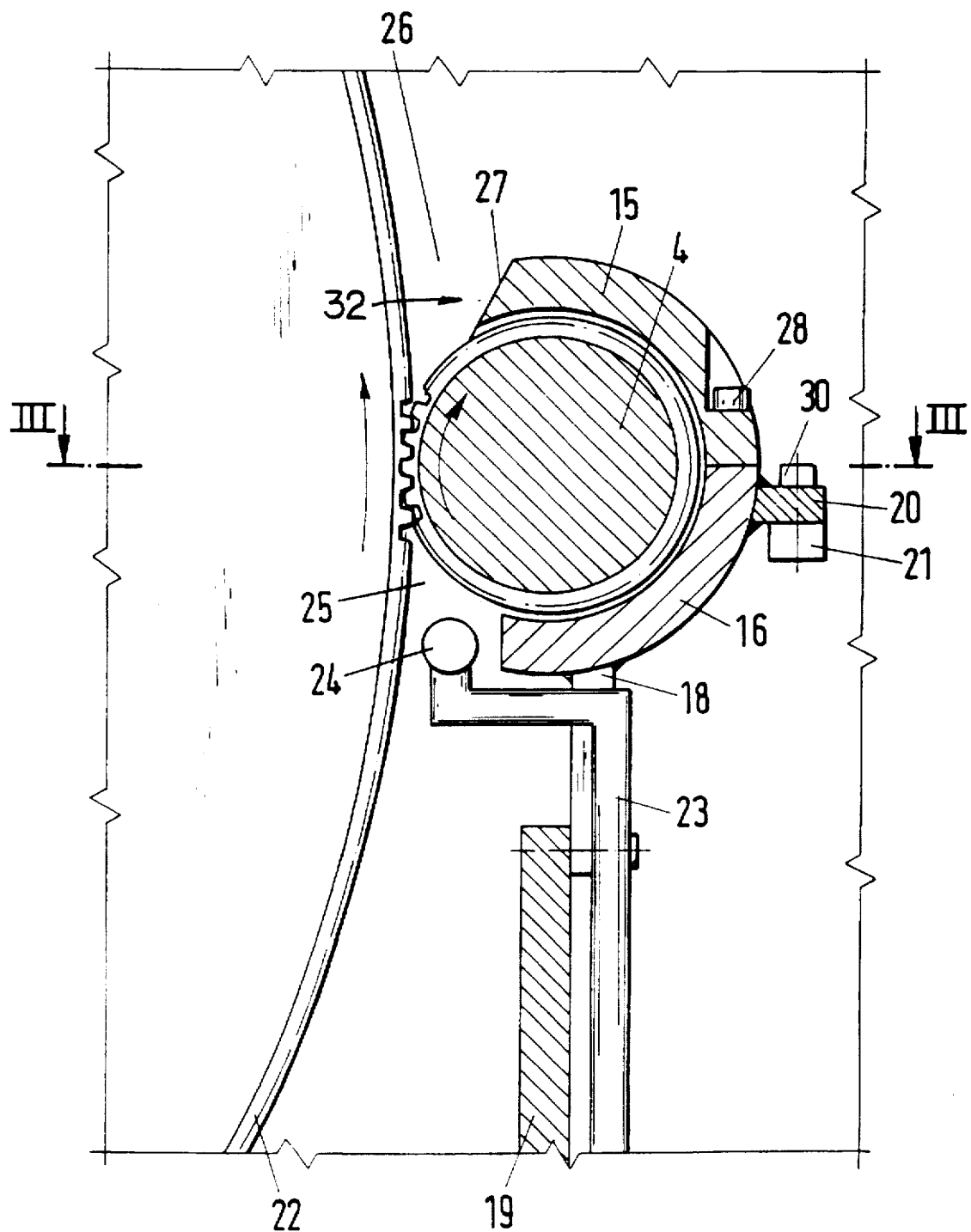
FIG. 2 is Section II—II in FIG. 1.
Figure 3:
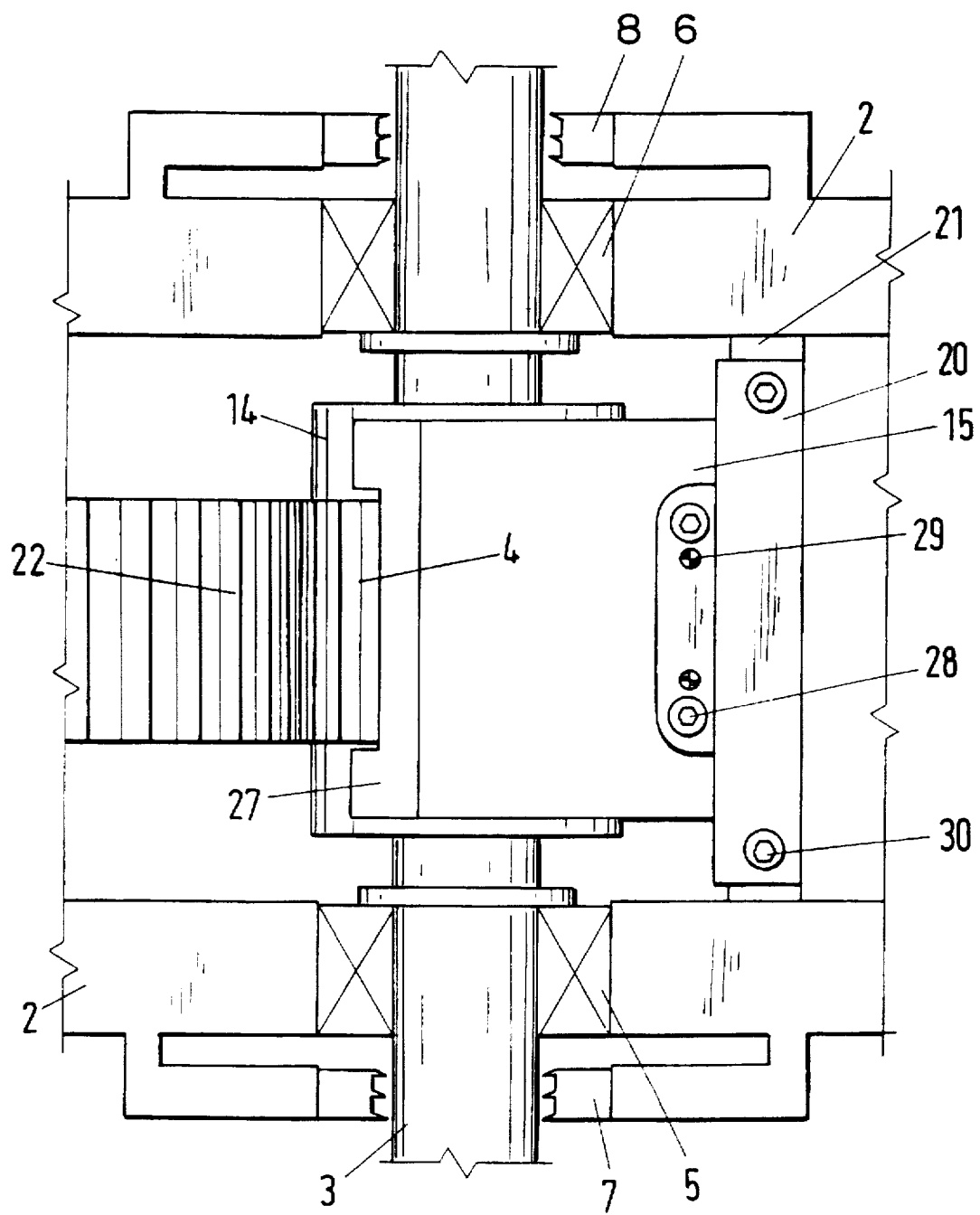
FIG. 3 is a view along line III—III in FIG. 2.

FIG. 2 shows the engagement of the pinion 4 with the gearwheel 22. The direction of rotation is indicated by arrows. In this figure, it can be seen that the lubricant is supplied directly in front of the beginning of the encapsulation by a line 23 and an oil sprayer 24 in the area 25 of tooth engagement. The tangential spraying-off of lubricant in the tooth disengagement area 26 has a supportive effect in producing a negative pressure. For the same purpose, the back end area 27 of the encapsulation is designed so that there is constant enlargement for the non-covered cross-sectional area 32, viewing the tooth disengagement area 26 as the starting point. The upper part 15 of the encapsulation is connected to the lower part 16 by screws 28 and adjustment pins 29, as shown in FIG. 3. The encapsulation also has a front end 31 in the in the engagement area 25.

The invention is not limited by the embodiments described above which are presented as examples only but can be modified in various ways within the scope of protection defined by the appended patent claims.

I claim:

1. A device for reducing ventilation loss of a high-speed gear mechanism having a gear housing which encloses an intermeshing pinion and gear wheel wherein the pinion is driven by the gear wheel, the device comprising: means for spraying lubricant to a narrowing engagement area of the pinion and gear wheel so as to reduce friction; means for encapsulating only the pinion over more than 180° of its perimeter so that the encapsulating means has a front end in the engagement area and a back end in a disengagement area of the pinion and the gear wheel, the back end of the encapsulating means being configured to constantly enlarge a non-covered cross-sectional area between the pinion and the gear wheel so as to utilize pressure that is automatically established in the engagement and disengagement areas; and, means for sealing the encapsulating means on both sides relative to non-toothed shaft sections of the pinion.

2. A device as defined in claim 1, wherein the sealing means includes a labyrinth seal mounted to the encapsulating means.

3. A device as defined in claim 1, wherein the encapsulating means includes two housing parts connected to one another on a radial plane, and further comprising means for attaching the housing parts of the encapsulating means to the gear housing.

4. A device as defined in claim 3, wherein the two housing parts include an upper housing part and a lower housing part, the attaching means including a reinforcement plate mountable to the gear housing, and brackets mounted between the lower housing part and the reinforcement plate.

5. A device as defined in claim 4, wherein the attaching means further includes a claw fixed to the lower housing part of the encapsulating means and a further bracket mounted to the gear housing, the claw being engagable with the bracket.

6. A device as defined in claim 3, and further comprising a screw means for connecting together the two housing parts of the encapsulating means.

7. A device as defined in claim 1, wherein the lubricant supply means includes a supply line arranged to end in the narrowing tooth engagement area directly in front of the front end of the encapsulating means.

8. A combination of a high-speed gear mechanism and a device for reducing ventilation loss of the high-speed gear mechanism, the combination comprising a gear housing; a gear wheel arranged in the gear housing; a pinion arranged in the gear housing so as to mesh with and be driven by the gear wheel; means for spraying lubricant to an area of engagement of the pinion and the gear wheel so as to reduce friction; means for encapsulating only the pinion over more than 180° of its perimeter so that the encapsulating means has a front end in the engagement area and a back end in a disengagement area of the pinion and gear wheel, the back end of the encapsulating means being configured to constantly enlarge a non-covered cross-sectional area between the pinion and the gear wheel, so as to utilize pressure that is automatically established in the engagement and disengagement areas; and, means for sealing the encapsulating means on both sides relative to non-toothed shaft sections of the pinion.

* * * * *